May 17, 1938.    E. A. MITCHELL    2,117,565
ELECTRICITY THEFT PREVENTION DEVICE
Filed June 20, 1936
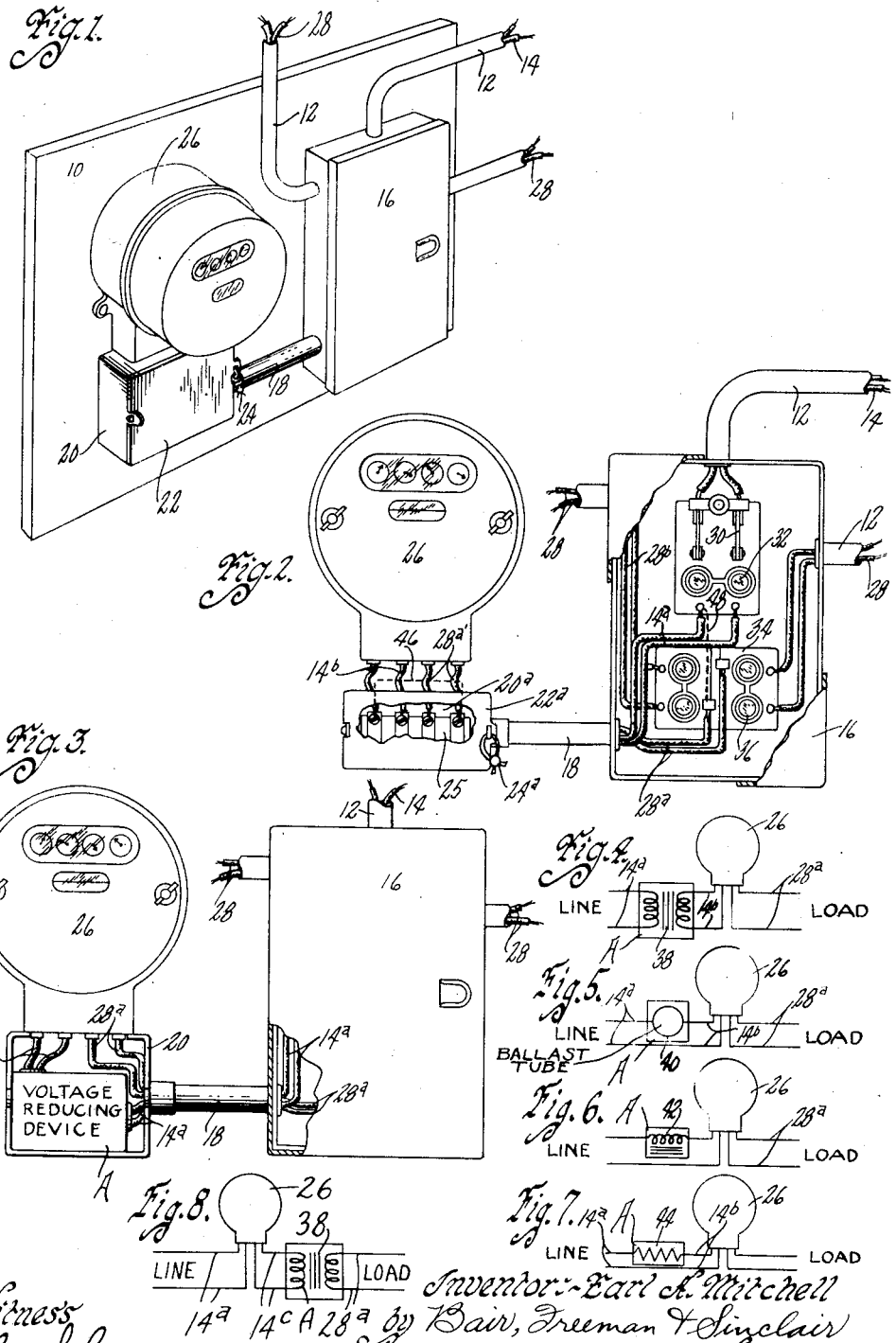

Patented May 17, 1938

2,117,565

UNITED STATES PATENT OFFICE 2,117,565

ELECTRICITY THEFT PREVENTION DEVICE

Earl A. Mitchell, Newton, Iowa, assignor of one-third to Dorothy Gregson, Montezuma, Iowa Application June 20, 1936, Serial No. 86,321

2 Claims. (Cl. 171—34)

The object of my invention is to provide an electricity theft prevention device which is simple, durable and of comparatively inexpensive construction.

A further object is to provide an electricity theft prevention device which will prevent successful use of "jumpers" or other devices for shunting electric current around a meter so that current can be secured without registering on the meter.

More particularly it is my object to provide theft prevention mechanism in the form of a voltage reducing device so arranged that any attempt to use "jumpers" will result in supplying a higher voltage to the load wires than they are supposed to carry, with the result that electric devices connected therewith will be burned out or otherwise damaged by the excessive current, thus curing anyone of using "jumpers" in this manner.

Still a further object is to provide a device which not only acts for the purpose of a theft prevention of electricity, but also as a device to maintain a higher voltage in the supply wires of an electric line when employing a transformer at the meter, thus effecting a saving in copper wire for the supply line to the meter.

With these and other objects in view my invention consists in the construction, arrangement and combination of the various parts of my device, whereby the objects contemplated are attained, as hereinafter more fully set forth, pointed out in my claims and illustrated in the accompanying drawing, in which:

Figure 1 is a perspective view of an installation including my theft prevention device.

Figure 2 is a front elevation of an installation as now ordinarily used and illustrating in dotted lines how "jumpers" can be used to prevent registry of electricity on the meter.

Figure 3 is a similar front elevation showing my electricity theft prevention device in use.

Figure 4 illustrates diagrammatically my device employing a transformer in the line wires.

Figures 5, 6 and 7 are similar diagrammatic views showing different forms of voltage reducing devices which can be used to practice my invention; and Figure 8 is a similar diagrammatic view showing the voltage reducing device in the load instead of the line wire.

On the accompanying drawing, the reference numeral 10 indicates a base or mounting board usually required for the mounting of parts of an electrical distribution system such as used in a residence. Conduits 12 are illustrated through one of which line wires 14 extend. The conduits 12 are connected with a switch box 16 from which a conduit 18 extends.

The conduit 18 in my installation is connected with a casing 20 having a removable cover 22. The cover 22 is sealed by the ordinary type of seal 24 against unauthorized entry to the interior of the casing.

Surmounting the casing 20 and preferably positioned against the upper wall thereof is a meter 26. Within the casing 20 I mount a voltage reducing device indicated at A.

The line wires 14 extend to a cutout switch 30 and then through fuses 32 to line wires 14a which extend through the conduit 18 to the voltage reducing device. Further leads 14b extend from the voltage reducing device to the meter for electrically connecting the voltage reducing device with the line side of the meter. Load wires 28 extend from the switch box 16, these being connected with fuses 36 of a fuse block 34. The fuses are connected by means of wires 28a with the load side of the meter 26.

The voltage reducing device may be made in several forms. The preferable form is a step down transformer, such as indicated at 38 in Figure 4. Figures 5, 6 and 7 show diagrammatically other forms of voltage reducing devices 40, 42 and 44, which are a ballast tube, a choke coil and a resistance element respectively.

Referring to Figure 2, the usual installation for which my electricity theft prevention device is substituted consists of a casing 20 having a terminal block 25 therein. This casing has a cover 22a sealed as at 24a and the line and load wires 14a and 28a are connected within the casing to the terminal block. The leads 14b and leads 28a' are also connected with the terminal block. Such an installation leaves the wires 14b and 28a' exposed so that a "jumper" wire, such as indicated at 46 may be inserted in such a manner that it will contact with the terminals on the terminal block 25 and shunt out the metering coil of the meter 26.

Another way of shunting this coil out is with a "jumper" 48 which is arranged within the switch box 16. By my installation, assuming that the line wires 14 carry 150 volts and the voltage reducing device reduces the voltage to 110 volts, it is obvious that a "jumper" such as 46 cannot be used because the leads 14b are inaccessible within the casing 20. A "jumper" such as 48, if used, will not cause any current flow from the line wire on the primary side of the transformer 38 to the load wire on the secondary side of the transformer because the primary and secondary are connected only by induction. Therefore a single wire such as 48 will have no effect.

A single "jumper" wire, such as 48, used on the proper line and load wires in a theft prevention device using the ballast tube 40, the choke coil 42 or the resistance element 44, however, will cause these devices to be shunted out of the circuit so that 150 volts is thrown into the load wires and will burn out any electrical device connected therewith, or at least damage it and will thus cure any would-be electricity thief from repeating such an attempt. Likewise, if two "jumper" wires like 48 are used from the two line wires 14a to the two load wires 28, the 150 volt line current will be fed to the load wires in the same manner.

By making the leads 14b inaccessible, connection cannot be made with the low voltage side of the voltage reducing device for causing the current to jump therefrom to the load wires without going through the meter.

Although I have thus far described the voltage reducing device as being in the line wires, it can be in the load wires instead, as illustrated in Figure 8. Any "jumpers" across from the wires 14a to the wires 28a would shunt out the transformer 38 as well as the meter 26, thus inducing a high voltage in the load wires, accomplishing the same result as hereinabove described. Wires 14c extend from the meter to the transformer instead of wires 14b extending from the transformer to the meter, as in Figure 4.

I claim:

1. An electricity theft prevention device for use with line wires, a meter and load wires, comprising a voltage reducing device having inaccessible connection with the meter and being located between said line wires and said load wires, the voltage of the line wires being enough greater than the normal voltage of the load wires to damage any appliance normally connected with the load wires if the voltage of the line wire is applied thereto by any connection which shunts the meter and voltage reducing device, a closed casing for said voltage reducing device and electrical connections between said voltage reducing device and said meter, said electrical connections being located within said casing and thereby inaccessible except by opening said casing.

2. An electricity theft prevention device for use with a meter between line and load wires and a meter connected in circuit with the load wires, comprising a step-down transformer located between said line wires and said load wires and inaccessible electrical connections between said transformer and said meter, the voltage of the line wires being enough greater than the normal voltage of the load wires to damage any appliance normally connected with the load wires if the voltage of the line wires is applied thereto by any connection which shunts the meter and transformer.

EARL A MITCHELL.